UNITED STATES PATENT OFFICE.

LEON LILIENFELD, OF VIENNA, AUSTRIA-HUNGARY.

PROCESS OF PRODUCING SULFUR DERIVATIVES DERIVED FROM GLYCERIN.

1,018,329.  Specification of Letters Patent.  Patented Feb. 20, 1912.

No Drawing.   Application filed November 10, 1911.   Serial No. 659,593.

*To all whom it may concern:*

Be it known that I, LEON LILIENFELD, doctor, chemist, a subject of the Emperor of Austria-Hungary, residing at 1 Zeltgasse, Vienna VIII, Austria-Hungary, have invented certain new and useful Improvements in Processes of Producing Sulfur Derivatives Derived from Glycerin, of which the following is a specification.

My invention relates to a process of producing sulfur derivatives derived from glycerin.

In two articles published in *Liebig's Annalen*, vol. 122, p. 71 ff. and vol 124, p. 221 ff. Carius has described the products obtained by the reaction of monochlorhydrin, dichlorhydrin and trichlorhydrin with an alcoholic potassium sulfhydrate solution and has identified the same as monothioglycerin, dithioglycerin and trithioglycerin. These thioglycerins are viscous, disagreeably smelling bodies, soluble in alcohol, which when heated are converted into products rich in carbon, sulfureted hydrogen being produced.

Now I have found that the halogenhydrins derived from glycerin or its polymerids, with the exception of trihalogenhydrins, with inorganic sulfids lead to other bodies which can be used for a large number of technical purposes. The bodies produced by the action of inorganic sulfids on the above mentioned halogenhydrins are also of a viscous consistence, but primarily differ from the thioglycerins in that they are only very slightly soluble in cold alcohol and are almost inodorous. Further, I have found that the products obtained when the above mentioned halogenhydrins react with inorganic sulfids under the action of heat or with substances which abstract mineral acid or water, or with condensation agents or oxidizing agents, are gradually converted into solid, viscous and elastic, caoutchouc-like bodies which, when the action of these agents lasts for a long time, finally change into hard, horn-like bodies. No clear idea could be obtained heretofore as to the elementary and constitutional formulæ of these bodies; taking dichlorhydrin as an example it may, however, be assumed that the following reactions take place:—

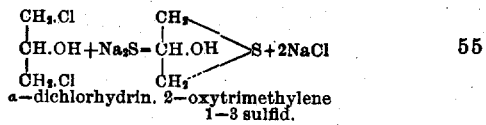
α—dichlorhydrin.  2—oxytrimethylene 1–3 sulfid.

Corresponding to this assumption the β-chlorhydrin will lead, according to the present process, to the following body:—

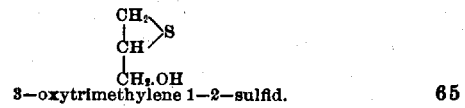
3—oxytrimethylene 1–2—sulfid.

The conversion into the solid bodies might be considered polymerization. The α-dichlorhydrin would thus lead to the compound

and the β-dichlorhydrin to the compound

My process is carried into practice by subjecting halogenhydrins to the action of stoichiometric quantities of, or an excess of inorganic sulfids, preferably alkaline sulfids, in a dry or powdered state, but preferably dissolved in a suitable solvent, such as water, alcohol, or the like. The reaction may take place cold or under the action of heat. It must be noted that the reaction itself produces heat. If concentrated or not too dilute solutions are used, liquid or viscous products are obtained; if, however, very dilute solutions are employed or if the process is carried out at a high temperature, under certain circumstances more solid bodies are obtained.

As the products are scarcely soluble in water they fall to the bottom, particularly after completely cooling, and can be separated from the mother liquor by centrifuging or decanting the liquid or the like over them. They can be liberated from the adhering impurities, *e. g.* chlorids, possibly an excess of metallic sulfids or non-converted halogenhydrin, by washing them with water or alcohol, in which they are but little soluble. The final removal of the water can be brought about either by drying in the air cold or at a moderate temperature, or *in vacuo*, or by treatment with alcohol, or with alcohol and ether in which they are likewise insoluble, and subsequent drying. If inorganic sulfids are worked with in an alcoholic solution, after the reaction is complete the final product can be obtained either by precipitating with water or by driving off or distilling off the alcohol. The body is then purified and dried in the same manner as above described. If the reaction has been begun with considerable excess of sulfids, the small part of the products which is dissolved in the solutions of these bodies having an alkaline reaction can be obtained by neutralizing with acids or by acidifying the reaction mixture as such, or the mother liquors separated from the products, after the reaction is complete.

Example: 60-120 parts by weight crystallized sodium sulfid dissolved in 30-240 parts by weight of water and filtered when desired are gradually poured onto 30 parts by weight of dichlorhydrin while stirring the same. During the reaction the temperature rises so that it is preferable to cool the mixture to 30-60° C. As soon as the entire quantity of the sodium sulfid solution has been poured in, stirring is continued for a time, and after the viscous product formed during the reaction has been allowed completely to settle the mother liquor over it is decanted either as it is or after it has been previously neutralized or acidified. The product itself is stirred and frequently washed with water and dried in the air or *in vacuo*. The washing with water may be followed by a washing with alcohol or with alcohol and ether, whereupon the product will be dried. When colorless products have been started with, the body obtained is a colorless or bright yellow thick viscous syrup. This syrup is scarcely soluble in water and alcohol and very little soluble in hot alcohol. If this cold or heated syrup is treated with dilute or with concentrated mineral acid it becomes gradually solid and converted into a caoutchouc like mass which can be liberated by washing from the mineral acid. If the boiling with the mineral acid is continued for a long time, the mass becomes constantly harder and loses its elasticity and finally becomes similar to a hard rosin or to horn. The body undergoes a similar change when treated with organic acids, *e. g.* acetic or formic acid and the like, at atmospheric or an increased pressure. The body is converted into similar substances when it is heated by itself or in the presence of a neutral diluting agent at a normal or increased pressure.

How the process is carried into practice with solid sulfids or sulfids dissolved in other solvents will be readily understood from the above by a person versed in the art.

What I claim as my invention and desire to secure by Letters Patent is:

1. The herein described process of producing sulfur derivatives derived from glycerin, which consists in subjecting halogenhydrins containing at least one hydroxyl group to the action of inorganic sulfids.

2. The herein described process of producing sulfur derivatives derived from glycerin which consists in subjecting halogenhydrins containing at least one hydroxyl group to the action of inorganic alkaline sulfids.

In testimony whereof I have affixed my signature in presence of two witnesses.

LEON LILIENFELD.

Witnesses:
 FRANZ REITER,
 AUGUST GUGGER.